(12) United States Patent
Yu et al.

(10) Patent No.: US 10,313,964 B2
(45) Date of Patent: Jun. 4, 2019

(54) WIFI ACCESS SYSTEM

(71) Applicant: SHANGHAI LIANSHANG NETWORK TECHNOLOGY CO., LTD., Shanghai (CN)

(72) Inventors: Luojia Yu, Shanghai (CN); Fayou Zhang, Shanghai (CN)

(73) Assignee: SHANGHAI LIANSHANG NETWORK TECHNOLOGY CO., LTD., Shanghai (CN)

( * ) Notice: Subject to any disclaimer, the term of this patent is extended or adjusted under 35 U.S.C. 154(b) by 57 days.

(21) Appl. No.: 15/551,905

(22) PCT Filed: Jan. 12, 2016

(86) PCT No.: PCT/CN2016/070672
§ 371 (c)(1),
(2) Date: Aug. 18, 2017

(87) PCT Pub. No.: WO2016/134625
PCT Pub. Date: Sep. 1, 2016

(65) Prior Publication Data
US 2018/0262982 A1    Sep. 13, 2018

(30) Foreign Application Priority Data

Feb. 27, 2015 (CN) .......................... 2015 1 0089042

(51) Int. Cl.
*H04W 4/00* (2018.01)
*H04W 48/20* (2009.01)
(Continued)

(52) U.S. Cl.
CPC ............. *H04W 48/20* (2013.01); *H04W 4/60* (2018.02); *H04W 8/24* (2013.01);
(Continued)

(58) Field of Classification Search
CPC ..... H04W 48/20; H04W 48/14; H04W 48/16; H04W 8/24; H04W 12/08; H04W 64/003
(Continued)

(56) References Cited

U.S. PATENT DOCUMENTS 8,588,413 B1 11/2013 Kalbag et al.
2012/0026992 A1* 2/2012 Navda ............... H04W 52/0203
370/338
(Continued)

FOREIGN PATENT DOCUMENTS

CN   103298072 A   9/2013
CN   103813474 A   5/2014
(Continued)

*Primary Examiner* — Thai D Hoang
(74) *Attorney, Agent, or Firm* — Gokalp Bayramoglu

(57) ABSTRACT

The present invention discloses a WiFi access system, which collects a list of WiFi access points around a mobile terminal, and determines a final location of the mobile terminal based on a positioning information of each of the WiFi access points, positioning information of a base station, and satellite positioning information; a cloud server sends password information of each available WiFi access point to the mobile terminal according to sorting result of the list of WiFi access points based on degree of accessing difficulty of the mobile terminal and the final location information of the mobile terminal, in combination with an identification code, a password, and a geographic position of each of the WiFi access points locally stored, so that the mobile terminal can conveniently access the corresponding available WiFi access points.

9 Claims, 2 Drawing Sheets

(51) Int. Cl.
*H04W 48/16* (2009.01)
*H04W 8/24* (2009.01)
*H04W 12/08* (2009.01)
*H04W 48/14* (2009.01)
*H04W 64/00* (2009.01)
*H04W 4/60* (2018.01)
*H04W 12/06* (2009.01)
*H04W 84/12* (2009.01)

(52) U.S. Cl.
CPC ....... *H04W 12/0608* (2019.01); *H04W 12/08* (2013.01); *H04W 48/14* (2013.01); *H04W 48/16* (2013.01); *H04W 64/003* (2013.01); *H04W 84/12* (2013.01)

(58) Field of Classification Search
USPC .............. 370/328–330, 335–338, 342–349
See application file for complete search history.

(56) References Cited

U.S. PATENT DOCUMENTS

| | | | | |
|---|---|---|---|---|
| 2012/0293465 | A1* | 11/2012 | Nandu | H04W 4/60 345/204 |
| 2013/0128755 | A1* | 5/2013 | Ullah | G01S 5/02 370/252 |
| 2015/0055633 | A1* | 2/2015 | Wu | H04W 52/346 370/336 |
| 2016/0044065 | A1* | 2/2016 | Zhu | H04W 4/90 370/329 |
| 2016/0050541 | A1* | 2/2016 | Youssef | H04W 4/043 370/338 |
| 2016/0182294 | A1* | 6/2016 | Erickson | H04W 4/02 370/338 |
| 2016/0191380 | A1* | 6/2016 | De | H04L 45/74 370/338 |

FOREIGN PATENT DOCUMENTS

| | | |
|---|---|---|
| CN | 104144415 A | 11/2014 |
| CN | 104818991 A | 5/2015 |
| CN | 104717721 A | 6/2015 |

* cited by examiner

WIFI ACCESS SYSTEM

CROSS REFERENCE TO RELATED APPLICATIONS

This application is the national phase entry of International Application No. PCT/CN2016/070672, filed on Jan. 12, 2016, which is based upon and claims priority to Chinese Patent Application No. 201510089042.1, filed on Feb. 27, 2015, the entire contents of which are incorporated herein by reference.

TECHNICAL FIELD

The present invention relates to network communication technologies, and more particularly to a WiFi access system.

BACKGROUND OF THE INVENTION

As IEEE802.11 (wireless local area network standards) technologies have become gradually mature, WiFi (Wireless Fidelity), as a technology of wireless Internet access, has been used by more and more users, and has covered a wider area. Thus, an Access Point (AP) becomes an important way for the public to connect to a network. With the development of mobile equipment, nowadays, mobile communication equipment can also act as a mobile access point, that is, a mobile accessing hotspot technology, in which mobile network resources of the mobile equipment are shared over WiFi, to enable other mobile equipment to access the mobile access point over a WiFi network.

However, each access point is configured with an access password for authentication. All kinds of equipment that need to access the access point must input the password to complete the authentication. It is difficult for a user to acquire access passwords of too many access points, not to mention remembering them. As a result, it is difficult for a user to access WiFi conveniently anytime and anywhere.

A position information of a target has played an important role in various scenarios, for example, vehicle navigation, staff positioning under coal mine, construction site management, and so on. GPS (Global Positioning System), as a satellite navigation positioning technology being most widely used globally, has been widely applied in various fields. However, its signals are extremely easily interfered and blocked by barriers, which results in poor positioning effects in the environment such as intense metropolitan areas, tunnels, indoor areas, and even results in positioning failure.

WiFi mainly relies on received signal strength (RSS) information contained in a beacon signal periodically sent by an access point or a base station to implement positioning and mobile computation. The WiFi-based positioning has the following advantages: it is feasible to work in different scenarios such as an indoor scenario, an outdoor scenario, and so on, offering a possibility for implementing positioning anywhere; it merely relies on the existing WiFi networks, for which no change is needed, therefore the usage cost is lower; and it can be used even in the case that barriers exist, since WiFi signals are less affected by non-line-of-sight factors.

An overwhelming majority of WiFi-based positioning systems are implemented based on RSS, the method of which are mainly classified into two types: a triangle algorithm and a position fingerprint identification algorithm. In the triangle algorithm, a target position is estimated by using the information of distance from a target to be measured and at least three reference points, which is converted to a distance from the target to be measured to each corresponding access point in practice based on a propagation fading model of wireless signals. In contrast, in the position fingerprint identification algorithm, a target position is acquired by comparing signal feature fingerprint information requested by positioning. Since the received signal strength is easily affected by an antenna height, a linear direction, and an environment, the WiFi positioning based on the triangle algorithm fails to achieve an ideal performance. On the contrary, the wireless positioning based on the position fingerprint identification does not need to figure out a position of the access point and an accurate signal channel model, which thus has a higher superiority compared with that based on triangle algorithm, regardless of specific implementation and positioning performance.

The Chinese Patent Application No. 201110131432.2 has provided a WiFi-based layered positioning system. The positioning system firstly determines a floor where a user of a mobile terminal stays based on a strength of wireless signals of a plurality of access points acquired and floors where the access points are located, and then acquires a final location information of the user of the mobile terminal by means of a fingerprint identification method. Meanwhile, reference points in the fingerprint identification method can be added and corrected continuously by means of participation of the users, thereby achieving the object that a plurality of terminal users can share the system. The system not only satisfies the demands that the users of the mobile terminals can acquire a positioning information of the exact floors where the users themselves stay, but also can make a judgment for the condition that a plurality of floors share the same access point, that is, identification stability is higher.

SUMMARY OF THE INVENTION

A technical problem to be solved by the present invention is to provide a WiFi access system, which enables users of mobile terminals to access available WiFi access points nearby anytime and anywhere, without remembering access passwords of a great number of access points.

In order to solve the above technical problem, the present invention provides a WiFi access system, which includes a mobile terminal and a cloud server.

The mobile terminal is disposed with a WiFi client, a mobile data communication network access module, and a satellite positioning module, and is further disposed with a WiFi assisted access client.

The WiFi client is used for acquiring a positioning information of each WiFi access point around a mobile terminal after being actuated.

The mobile data communication network access module is used for accessing a mobile data communication network, and acquiring a base station positioning information of a mobile data communication network around the mobile terminal.

The satellite positioning module is used for acquiring a satellite positioning information of the mobile terminal.

The mobile terminal can be communicated with the cloud server over a mobile data communication network.

The cloud server stores an identification code, a password, and a geographic position of each WiFi access point.

A working process of the WiFi assisted access client is described as follows:

I. being actuated;

II. acquiring a data list of WiFi access points around a mobile terminal, and determining a final location information of the mobile terminal based on a positioning information of each WiFi access point, a base station positioning information, and a satellite positioning information;

Data items in the data list of the WiFi access points include: an identification code and a signal strength of each WiFi access point.

III. determining whether the mobile terminal has been currently connected to the Internet or not, and if the mobile terminal has been connected to the Internet, Step IV is carried out;

IV. uploading the data list of the WiFi access points around the mobile terminal and the final location information of the current mobile terminal to the cloud server;

V. if no WiFi password information of an available WiFi access point being currently easily accessed sent by the cloud server is received within a set time period, Step VII is carried out; and if a WiFi password information of an available WiFi access point being currently easily accessed sent by the cloud server is received within a set time period, Step VI is carried out;

VI. connecting to the available WiFi access point being currently easily accessed based on the WiFi password information of the available WiFi access point being currently easily accessed sent by the cloud server; if connection succeeds, sending a WiFi accessing success information to the cloud server, and Step VII is carried out; and if connection fails, sending a WiFi accessing failure information to the cloud server; and VII. ending.

A working process of the cloud server is described as follows:

(I). analyzing whether there exist available WiFi access points in the data list of the WiFi access points or not based on the data list of the WiFi access points around the mobile terminal and the final location information of the current mobile terminal; if available WiFi access points exist, sorting the available WiFi access points based on an accessing difficulty degree of the mobile terminal, taking an available WiFi access point that is most easily accessed as the available WiFi access point being currently easily accessed, and Step (II) is carried out; and if no available WiFi access points exist, Step (VI) is carried out;

(II). sending a WiFi password information of the available WiFi access point being currently easily accessed by the mobile terminal to the mobile terminal;

(III). if receiving the WiFi accessing success information sent by the mobile terminal, Step (VI) is carried out; and if receiving the WiFi accessing failure information sent by the mobile terminal, Step (IV) is carried out;

(IV). if the WiFi password information of all available WiFi access points have all been sent to the mobile terminal, Step (VI) is carried out; otherwise, Step (V) is carried out.

(V). taking a next available WiFi access point as an available WiFi access point being currently easily accessed, and Step (II) is carried out;

(VI). ending.

Preferably, the WiFi assisted access client is used for, in Step III, if the mobile terminal has not been connected to the Internet currently:

a) if the mobile terminal has not yet been connected to the Internet, but has been connected to a certain WiFi access point, disconnecting the WiFi access point first, and outputting an inquiry information about whether to access a mobile data communication network or not;

if receiving a positive selection information of a user, controlling the mobile terminal to access the mobile data communication network; and if receiving a negative selection information of the user, that is, the user selects NO, performing no operations, and ending;

b) if the mobile terminal has been neither connected to the Internet, nor connected to any WiFi access point, outputting an inquiry information about whether to access a mobile data communication network or not;

if receiving a positive selection information of a user, controlling the mobile terminal to access the mobile data communication network; and if receiving a negative selection information of the user, that is, the user selects NO, performing no operations, and ending.

Preferably, in Step III, if the mobile terminal has currently been connected to the Internet over a mobile data communication network or a WiFi access point, Step IV is carried out.

Preferably, the cloud server determines a difficulty degree for the mobile terminal to access each available WiFi access point, based on a signal strength and a distance from a geographic position of each available WiFi access point to a final position of the mobile terminal.

Preferably, the cloud server further stores an access control address and an encryption mode of each mobile terminal and each WiFi access point.

Preferably, the mobile terminal is a tablet personal computer, a cell phone, a notebook computer, or a vehicle-mounted computer.

Preferably, the mobile data communication network is a 2G; 3G; or 4G mobile data communication network.

Preferably, the satellite positioning module is a GPS positioning module, a BDS positioning module, or a GLONASS positioning module.

The WiFi access system of the present invention collects a data list of WiFi access points around a mobile terminal, and determines a final location information of the mobile terminal through analysis, computation, and comparison based on a positioning information of each of the WiFi access points, a base station positioning information, and a satellite positioning information; a cloud server can send a password information of each available WiFi access point to the mobile terminal according to an sorting of accessing difficulty degree of the mobile terminal based on the data list of the WiFi access points around the mobile terminal and the final location information of the mobile terminal, in combination with an identification code, a password, and a geographic position of each of the WiFi access points locally stored, so that the mobile terminal can conveniently access the corresponding available WiFi access points. By using the WiFi access system of the present invention, a user can conveniently access available WiFi access points nearby anytime and anywhere, without remembering access passwords of a great number of access points.

BRIEF DESCRIPTION OF THE DRAWINGS

In order to demonstrate the technical solution of the present invention more clearly, accompanying drawings that need to be used in the present invention are briefly described below. Apparently, the accompanying drawings described below are merely some embodiments of the present invention. Persons ordinarily skilled in the art can further derive other accompanying drawings based on the drawings herein without making creative labor work.

DETAILED DESCRIPTION OF THE INVENTION

The technical solutions of the present invention are described below with reference to the accompanying drawings. Apparently, the embodiments described below are only a part of the embodiments of the present invention, instead of all the embodiments. Based on the embodiments in the present invention, all the other embodiments derived by persons ordinarily skilled in the art without making creative labor work fall within the protection scope of the present invention.

Embodiment 1

A WiFi access system includes a mobile terminal and a cloud server.

The mobile terminal is disposed with a WiFi client, a mobile data communication network access module, and a satellite positioning module, and is further disposed with a WiFi assisted access client.

The WiFi client can acquire positioning information of each of WiFi access points around a mobile terminal after being actuated.

The mobile data communication network access module is used for accessing a mobile data communication network, and acquiring a base station positioning information of a mobile data communication network around the mobile terminal.

The satellite positioning module is used for acquiring a satellite positioning information of the mobile terminal.

The mobile terminal can be communicated with the cloud server over a mobile data communication network.

The cloud server stores an identification code, a password, and a geographic position of each of the WiFi access points (AP).

Figure 1:
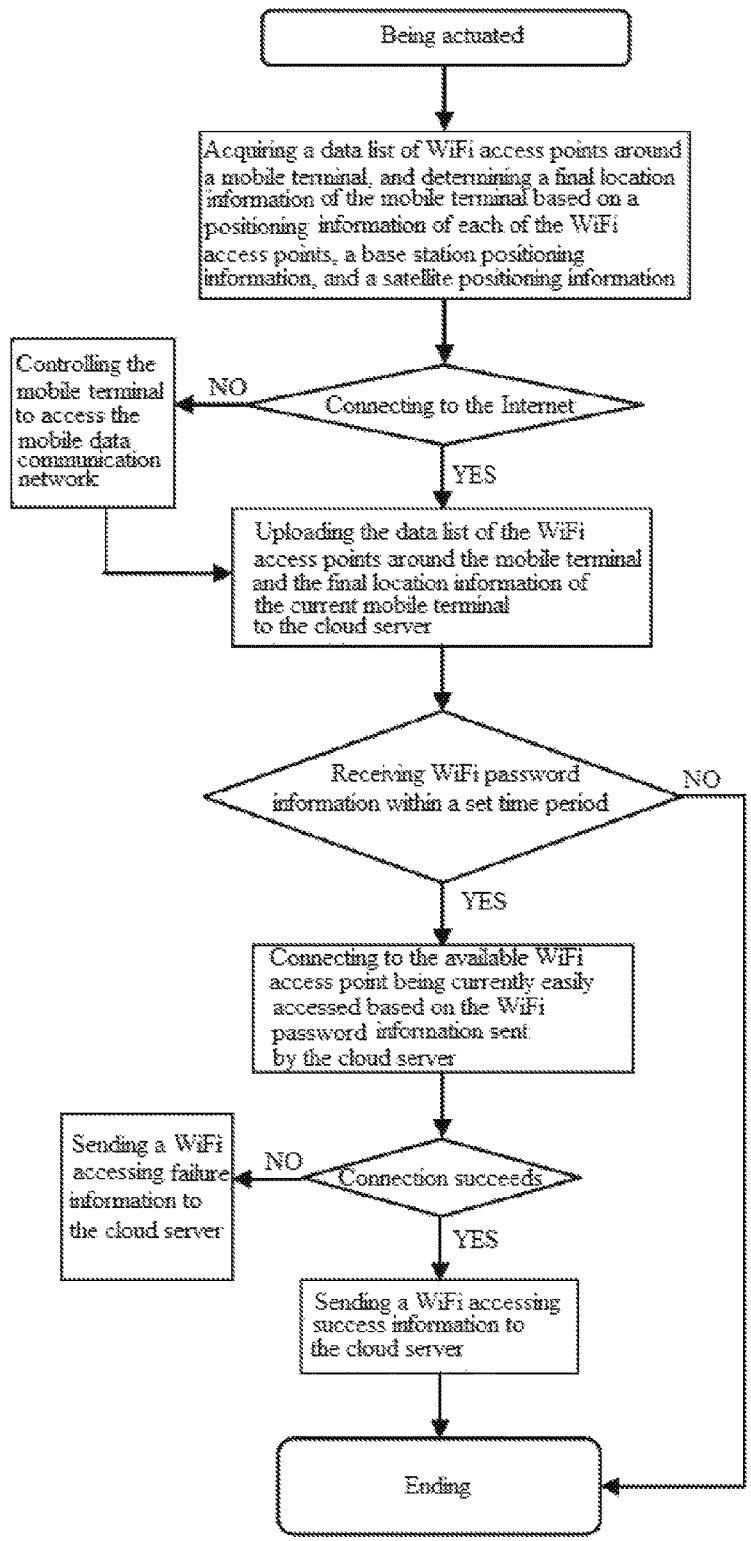
FIG. 1 is a working flow chart of a WiFi assisted access client in an embodiment of a WiFi access system of the present invention.

A working process of the WiFi assisted access client, as shown in FIG. 1, is described as follows:

I. being actuated;

II. acquiring a data list of WiFi access points around a mobile terminal, and determining a final location information of the mobile terminal through analysis, computation, and comparison, based on a positioning information of each of the WiFi access points, a base station positioning information, and a satellite positioning information;

Data items in the data list of the WiFi access points include: an identification code and a signal strength of each WiFi access point.

III. determining whether the mobile terminal has been currently connected to the Internet or not, and if the mobile terminal has been connected to the Internet, Step IV is carried out;

IV. uploading the data list of the WiFi access points around the mobile terminal and the final location information of the current mobile terminal to the cloud server;

V. if no WiFi password information of an available WiFi access point being currently easily accessed sent by the cloud server is received within a set time period, Step VII is carried out; and if a WiFi password information of an available WiFi access point being currently easily accessed sent by the cloud server is received within a set time period, Step VI is carried out;

VI. connecting to the available WiFi access point being currently easily accessed based on the WiFi password information of the available WiFi access point being currently easily accessed sent by the cloud server; if connection succeeds, sending a WiFi accessing success information to the cloud server, and Step VII is carried out; and if connection fails, sending a WiFi accessing failure information to the cloud server; and VII. ending.

Figure 2:
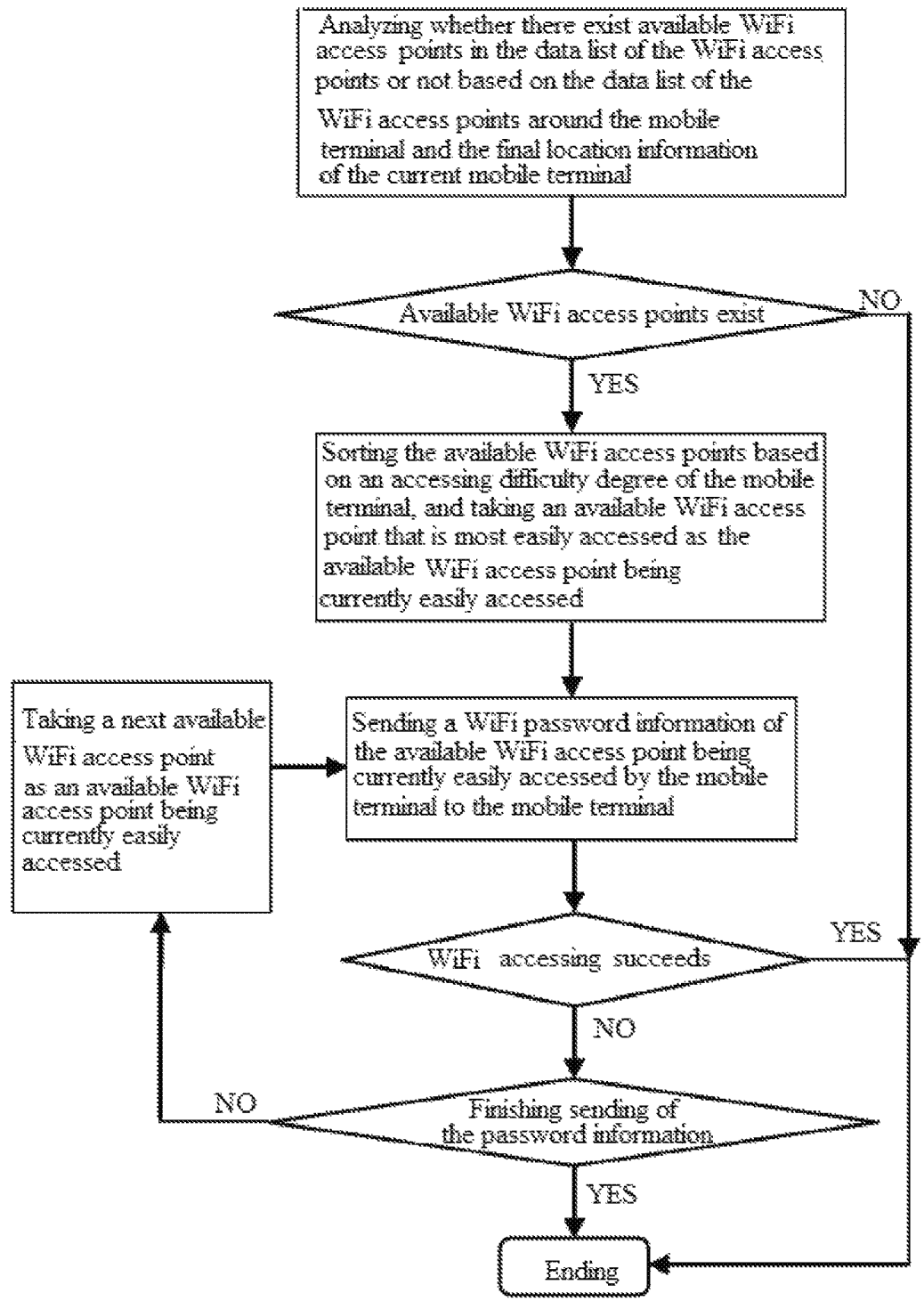
FIG. 2 is a working flow chart of a cloud server in an embodiment of a WiFi access system of the present invention.

A working process of the cloud server, as shown in FIG. 2, is described as follows:

(I). analyzing whether there exist available WiFi access points in the data list of the WiFi access points or not based on the data list of the WiFi access points around the mobile terminal and the final location information of the current mobile terminal; if available WiFi access points exist, sorting the available WiFi access points based on an difficulty degree of accessing the mobile terminal, taking an available WiFi access point that is most easily accessed as the available WiFi access point being currently easily accessed, and Step (II) is carried out; and if no available WiFi access points exist, Step (VI) is carried out;

(II). sending a WiFi password information of the available WiFi access point being currently easily accessed by the mobile terminal to the mobile terminal;

(III). if receiving the WiFi accessing success information sent by the mobile terminal, Step (VI) is carried out; and if receiving the WiFi accessing failure information sent by the mobile terminal, Step (IV) is carried out;

(IV). if the WiFi password information of all available WiFi access points have all been sent to the mobile terminal, Step (VI) is carried out; otherwise, Step (V) is carried out.

(V). taking a next available WiFi access point as an available WiFi access point being currently easily accessed, and Step (II) is carried out;

(VI). ending.

The WiFi access system of the embodiment 1 collects a data list of WiFi access points around a mobile terminal, and determines a final location information of the mobile terminal through analysis, computation, and comparison based on a positioning information of each of the WiFi access points, a base station positioning information, and a satellite positioning information; a cloud server can send a password information of each available WiFi access point to the mobile terminal according to an sorting of difficulty degree of accessing the mobile terminal based on the data list of the WiFi access points around the mobile terminal and the final location information of the mobile terminal, in combination with an identification code, a password, and a geographic position of each of the WiFi access points locally stored, so that the mobile terminal can conveniently access the corresponding available WiFi access points. By using the WiFi access system of the embodiment 1, a user can conveniently access available WiFi access points nearby anytime and anywhere, without remembering access passwords of a great number of access points.

Embodiment 2

Based on the WiFi access system in the embodiment 1, the WiFi assisted access client is used for, in Step III, if the mobile terminal has not been connected to the Internet currently:

a) if the mobile terminal has not yet been connected to the Internet, but has been connected to a certain WiFi access point, disconnecting the WiFi access point first, and outputting an inquiry information about whether to access a mobile data communication network or not;

if receiving a positive selection information of a user, controlling the mobile terminal to access the mobile data communication network; and if receiving a negative selection information of the user, that is, the user selects NO, performing no operations, and ending;

b) if the mobile terminal has been neither connected to the Internet, nor connected to any WiFi access point, outputting an inquiry information about whether to access a mobile data communication network or not;

if receiving a positive selection information of a user, controlling the mobile terminal to access the mobile data communication network; and if receiving a negative selection information of the user, that is, the user selects NO, performing no operations, and ending.

Preferably, in Step III, if the mobile terminal has currently been connected to the Internet over a mobile data communication network or a WiFi access point, Step IV is carried out.

Preferably, the cloud server determines a difficulty degree for the mobile terminal to access each available WiFi access point, based on a signal strength and a distance from a geographic position of each available WiFi access point to a final position of the mobile terminal.

Preferably, the cloud server further stores a MAC (media access control) address, an encryption mode, and so on, of each mobile terminal and each WiFi access point, can process big data, and can be called by clients by means of various network communications protocols.

Preferably, the mobile terminal is a tablet personal computer, a cell phone, a notebook computer, a vehicle-mounted computer, or any other smart terminal equipment.

Preferably, the mobile data communication network is a 2G, 3G, 4G mobile data communication network, and so on.

Preferably, the satellite positioning module is a GPS (Global Positioning System) positioning module, a BDS (BeiDou Navigation Satellite System) positioning module, or a GLONASS (Global Navigation Satellite System) positioning module.

The above described embodiments are only preferred embodiments of the present invention, instead of used for limiting the present invention. Any modification, equivalent replacement, improvement, and so on made within the spirits and principles of the present invention shall all fall within the protection scope of the present invention.

The invention claimed is:

1. A WiFi access system, comprising: a mobile terminal and a cloud server, wherein, the mobile terminal is disposed with a WiFi client end, a mobile data communication network access module, and a satellite positioning module; the mobile terminal is further disposed with a WiFi assisted access client end;

wherein, the WiFi client end, is used for acquiring positioning information of a WiFi access point around the mobile terminal after being actuated;

the mobile data communication network access module, is used for accessing a mobile data communication network, and acquiring base station positioning information of a mobile data communication network around the mobile terminal; and the satellite positioning module, is used for acquiring satellite positioning information of the mobile terminal; wherein, each available WiFi access point is determined based on final location information of the mobile terminal;

the final location information of the mobile terminal is determined based on at least one selected from the group consisting of WiFi access point positioning information, base station positioning information, and satellite positioning information;

the mobile terminal is enabled to communicate with the cloud server over the mobile data communication network; and the cloud server stores an identification code, a password, and a geographic position of the WiFi access point.

2. The WiFi access system of claim 1, wherein
the cloud server determines a difficulty degree for the mobile terminal to access each available WiFi access point, based on a signal strength and a distance from a geographic position of each available WiFi access point to a final position of the mobile terminal.

3. The WiFi access system of claim 1, wherein
the cloud server further stores an access control address and an encryption mode of each mobile terminal and the WiFi access point.

4. The WiFi access system of claim 1, wherein
the mobile terminal is selected from a group consisting of a tablet personal computer, a cell phone, a notebook computer, or a vehicle-mounted computer.

5. The WiFi access system of claim 1, wherein
the mobile data communication network is selected from a group consisting of a 2G, a 3G, or a 4G mobile data communication network.

6. The WiFi access system of claim 1, wherein
the satellite positioning module is selected from a group consisting of a GPS positioning module, a BDS positioning module, or a GLONASS positioning module.

7. A working process for a WiFi assisted access client end of a WiFi access system, comprising, step 1: actuating the WiFi assisted access client end;

step 2: acquiring a data list of a plurality of WiFi access points around a mobile terminal, and determining final location information of the mobile terminal based on at least one selected from the group consisting of WiFi access point positioning information, base station positioning information, and satellite positioning information;

wherein a plurality of data items in the data list of the plurality of WiFi access points comprise: an identification code and a signal strength of each WiFi access point;

step 3: determining whether the mobile terminal has been currently connected to an Internet or not, if the mobile terminal has been connected to the Internet, carrying out step 4;

step 4: uploading the data list of the plurality of WiFi access points around the mobile terminal and the final location information of a current mobile terminal to a cloud server;

step 5: if no WiFi password information of an available WiFi access point being currently easily accessed sent by the cloud server is received within a set time period, carrying out step 7; and if the WiFi password information of an available WiFi access point being currently easily accessed sent by the cloud server is received within the set time period, carrying out step 6;

step 6: connecting to the available WiFi access point being currently easily accessed based on the WiFi password information of the available WiFi access point being currently easily accessed sent by the cloud server; if connection succeeds, sending WiFi accessing success information to the cloud server, and carrying out step 7: further if connection fails, sending WiFi accessing failure information to the cloud server; and step 7: ending; wherein a working process of the cloud server comprises, step 1': analyzing whether there are an available WiFi access point in the data list of the plurality of WiFi access points or not based on the data list of the plurality of WiFi access points around the mobile terminal and the final location information of the current mobile terminal; if the available Win access point exists, sorting the available WiFi access point based on a difficulty degree of accessing the mobile terminal, taking an available WiFi access point that is most easily accessed as an available WiFi access point being currently easily accessed, then carrying out step 2'; further if no available WiFi access point exists, carrying out step 6';

step 2': sending the WiFi password information of the available WiFi access point being currently easily accessed by the mobile terminal to the mobile terminal;

step 3'; if the WiFi accessing success information sent by the mobile terminal is received, carrying out step 6'; and if the WiFi accessing failure information sent by the mobile terminal is received, carrying out step 4';

step 4': if the WiFi password information of each available WiFi access point has been sent to the mobile terminal, carrying out step 6', otherwise, carrying out step 5';

step 5'; taking a next available WiFi access point as the available WiFi access point being currently easily accessed, and carrying out step 2';

step 6': ending.

8. The WiFi access system of claim 7, wherein in step 3, if the mobile terminal has not been connected to the Internet currently, the process carried out by the WiFi assisted access client end further comprises, a) if the mobile terminal has not yet been connected to the Internet, but has been connected to a predetermined WiFi access point, firstly, disconnecting the predetermined WiFi access point, subsequently, outputting inquiry information about whether to access the mobile data communication network or not;

if positive selection information of a user is received, controlling the mobile terminal to access the mobile data communication network; and if negative selection information of the user is received, namely, the user selects NO, performing no operations, and ending;

b) if the mobile terminal has been neither connected to the Internet, nor connected to any WiFi access point, outputting the inquiry information about whether to access the mobile data communication network or not;

if the positive selection information of a user is received, controlling the mobile terminal to access the mobile data communication network; and if the negative selection information of the user is received, namely, the user selects NO, performing no operations, and ending.

9. The WiFi access system of claim 7, wherein in step 3, if the mobile terminal has currently been connected to the Internet over the mobile data communication network or the WiFi access point, carrying out step 4.

* * * * *